United States Patent
Hsieh et al.

(10) Patent No.: US 11,182,519 B2
(45) Date of Patent: Nov. 23, 2021

(54) OPTIMIZATION METHOD AND MODULE THEREOF BASED ON FEATURE EXTRACTION AND MACHINE LEARNING

(71) Applicant: INSTITUTE FOR INFORMATION INDUSTRY, Taipei (TW)

(72) Inventors: Chi-Chin Hsieh, Taichung (TW); Yen-Shou Hsieh, Taichung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 325 days.

(21) Appl. No.: 16/424,168

(22) Filed: May 28, 2019

(65) Prior Publication Data

US 2020/0184028 A1    Jun. 11, 2020

(30) Foreign Application Priority Data

Dec. 10, 2018   (TW) ................................ 107144367

(51) Int. Cl.
*G06F 30/20*       (2020.01)
*G06N 20/00*       (2019.01)
*G06F 111/10*      (2020.01)

(52) U.S. Cl.
CPC ............. *G06F 30/20* (2020.01); *G06N 20/00* (2019.01); *G06F 2111/10* (2020.01)

(58) Field of Classification Search
CPC ...... G06F 30/20; G06F 2111/10; G06N 20/00
USPC .......................................................... 703/2
See application file for complete search history.

(56) References Cited

U.S. PATENT DOCUMENTS

| 8,078,309 | B1 * | 12/2011 | Eyre ..................... G03F 7/0017 700/198 |
| 10,929,472 | B2 * | 2/2021 | Huang ................... G06N 5/022 |
| 2020/0230857 | A1 * | 7/2020 | Bonada Bo ........ G05B 13/0265 |

OTHER PUBLICATIONS

Deng_2008 (An Effective Approach for Process Parameter Optimization in Injection Molding of Plastic Housing Components, Polymer-Plastics Technology and Engineering, vol. 47, 2008—issue 9) (Year: 2008).*

* cited by examiner

*Primary Examiner* — Brian S Cook
(74) *Attorney, Agent, or Firm* — Birch, Stewart, Kolasch & Birch, LLP

(57) ABSTRACT

An optimization method based on feature extraction and machine learning is provided. At least one input parameter is received. Multiple first historical mold data are retrieved. A similarity calculation is performed according to the input parameter and the first historical mold data. Multiple candidate mold data are selected according to the similarity calculation. The mold design parameters of the candidate mold data corresponding to each input parameter are replaced by the input parameter, and multiple first representative mold data for performing a first simulation analysis are generated. Multiple key feature parameters are found, and multiple second historical mold data are retrieved according to the multiple key feature parameters. An expected data is found, and the mold design parameters of the expected data are filtered and optimized to find multiple second representative mold data for performing a second simulation analysis. At least one set of mold production parameters is generated.

9 Claims, 5 Drawing Sheets

OPTIMIZATION METHOD AND MODULE THEREOF BASED ON FEATURE EXTRACTION AND MACHINE LEARNING

This application claims the benefit of Taiwan application Serial No. 107144367, filed Dec. 10, 2018, the subject matter of which is incorporated herein by reference.

BACKGROUND OF THE INVENTION

Field of the Invention

The invention relates in general to an optimization method, and more particularly to an optimization method and a module thereof based on feature extraction and machine learning.

Description of the Related Art

Computer aided engineering (CAE) is often used in mold flow analysis during the mold development stage to simulate possible defects in mold production and to find an optimum production parameter. CAE can enhance mold quality and reduce manufacturing cost. Since the use of CAE requires a mass of try and error, it is very hard to shorten the schedule of mold development.

Since the selection of key features for a new mold lacks clear standard, it is always over-dependent on personal experience when it comes to the determination of key feature parameters. Besides, since the factors of a new mold to be considered in the mold development are versatile and complicated and the number of parameters is huge, the computation process is very time consuming. Moreover, due to the large variation range of the parameters of the new mold, the range of the parameters cannot be effectively limited and the subsequent cost of mold testing cannot be reduced.

Therefore, it has become a prominent task for the industries to provide a method capable of shortening the schedule of CAE mold flow analysis and reducing the cost of mold testing.

SUMMARY OF THE INVENTION

The invention is directed to an optimization method and a module thereof based on feature extraction and machine learning, through which the key feature parameters can be effectively found, and the mold design parameters can be filtered and optimized to limit the variation range of parameters.

According to one embodiment of the present invention, an optimization method based on feature extraction and machine learning is provided. The optimization method includes the following steps. At least one input parameter is received. Multiple first historical mold data relevant to the at least one input parameter are retrieved from a database. A similarity calculation is performed according to the at least one input parameter and multiple first historical mold data. At least two data are selected from the multiple first historical mold data according to a first result of the similarity calculation and are used as multiple candidate mold data, wherein each candidate mold data includes multiple mold design parameters. The mold design parameters corresponding to each input parameter in the candidate mold data are replaced by each input parameter, and multiple first representative mold data for performing a first simulation analysis are generated. Multiple key feature parameters are found according to multiple results of the first simulation analysis, and multiple second historical mold data matching the at least one input parameter are retrieved from the database according to the multiple key feature parameters. An expected data is found from the multiple second historical mold data, and the mold design parameters of the expected data are filtered and optimized to find multiple second representative mold data for performing a second simulation analysis. At least one set of mold production parameters is generated according to the result of the second simulation analysis.

According to another embodiment of the present invention, an optimization module based on feature extraction and machine learning and configured to work with a data retrieval unit and a simulation analysis unit is provided. The optimization module includes a database, a data selection unit, a feature extraction unit, a mold data comparison unit, a parameter optimization unit and a file creating unit. The database is configured to store multiple historical mold data, wherein the data retrieval unit receives at least one input parameter, and retrieves multiple first historical mold data relevant with the at least one input parameter from the database. The data selection unit is configured to perform a similarity calculation according to the at least one input parameter and the multiple first historical mold data, and to select at least two data from the multiple first historical mold data according to a first result of the similarity calculation and use the selected data as multiple candidate mold data, wherein each candidate mold data includes multiple mold design parameters. The data selection unit is further configured to replace the mold design parameters corresponding to each input parameter in each candidate mold data with each input parameter and to generate multiple first representative mold data for performing a first simulation analysis. The feature extraction unit is configured to find multiple key feature parameters according to multiple results of the first simulation analysis. The mold data comparison unit is configured to retrieve multiple second historical mold data matching the at least one input parameter from the database according to the multiple key feature parameters. The parameter optimization unit is configured to find an expected data from the multiple second historical mold data, and to filter and optimize the mold design parameters of the expected data to find multiple second representative mold data for performing a second simulation analysis, wherein the simulation analysis unit generates at least one set of mold production parameters according to the result of the second simulation analysis.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
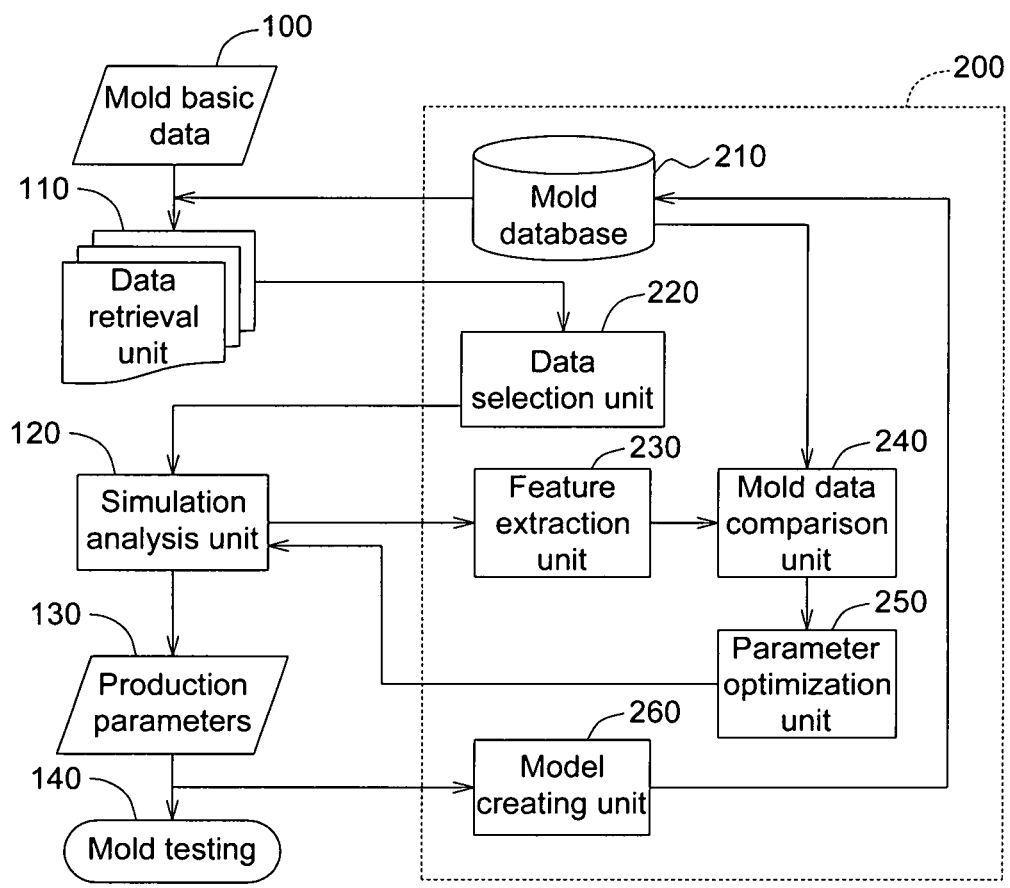
FIG. 1 is a system block diagram of an optimization module based on feature extraction and machine learning according to an embodiment of the present invention.

Detailed descriptions of the invention are disclosed below with a number of embodiments. However, the disclosed embodiments are for explanatory and exemplary purposes only, not for limiting the scope of protection of the invention. Similar/identical designations are used to indicate similar/identical elements. Directional terms such as above, under, left, right, front or back are used in the following embodiments to indicate the directions of the accompanying drawings, not for limiting the present invention.

According to an embodiment of the present invention, an optimization method based on feature extraction and machine learning is provided. Mold basic data is inputted to the data retrieval unit and is used as a retrieval condition, such that multiple historical mold data relevant with the retrieval condition can be retrieved from the database. Besides, multiple historical mold data having higher similarity with the mold basic data can be selected according to a similarity calculation algorithm and used as input data for a first simulation analysis. Therefore, the optimization method of the present embodiment can avoid the problems such as the parameter number of the mold basic data being huge and the computation process being too time consuming when a new mold data are created.

According to an embodiment of the present invention, an optimization method based on feature extraction and machine learning is provided. The first simulation analysis is performed using a mold flow analysis software (such as MoldFlow, 3D TIMON or Moldex 3D) to find multiple key feature parameters influential to the result of simulation analysis, and the multiple key feature parameters are further used as tracking targets in subsequent data optimization. Therefore, the optimization method of the present embodiment can avoid the problems of selection of feature parameters lacking clear standard in the conventional art, and the selection is over-dependent on personal experience when it comes to the determination of key feature parameters.

In an embodiment, when a particular input parameter is determined as a key feature parameter according to the result of first simulation analysis, the particular key feature parameter can be used as a retrieval condition for retrieving multiple second historical mold data from the database, and a model similarity comparison is performed to find an expected data from the multiple second historical mold data. Then, variation subdivision and filtering are performed to the mold design parameters of the expected data and multiple second representative mold data for performing a second simulation analysis are found using a Taguchi orthogonal table. After the mold data are filtered and optimized, the second representative mold data is an optimal mold production parameter closest to the input parameter. Since the optimization method of the present embodiment does not require a large mass of try and error, the schedule of mold development can be greatly shortened.

In an embodiment, after the second representative mold data for performing a second simulation analysis is found, the result of the second simulation analysis and the second representative mold data can be created in the mold database and used as a comparison basis in next mold building of new mold. Meanwhile, multiple results of the first simulation analysis and multiple first representative mold data can also be created in the mold database and used as training data and comparison basis in next mold building of new mold. Therefore, the optimization method of the present embodiment makes the simulation results more accurate.

In an embodiment, at least one OK mold production parameter obtained from the second simulation analysis using the above optimization method can be used in actual mold production test to manufacture a mold, and the result of the mold flow analysis is verified. Therefore, the optimization method of the present embodiment can reduce the cost of mold testing.

Refer to FIG. 1. According to an embodiment of the present invention, the optimization module 200 based on feature extraction and machine learning includes a mold database 210, a data selection unit 220, a feature extraction unit 230, a mold data comparison unit 240, a parameter optimization unit 250 and a model creating unit 260. The optimization module 200 can work with a data retrieval unit 110 and a simulation analysis unit 120 to find at least one set of mold production parameters 130 suitable for the production of mold testing 140.

Figure 2:
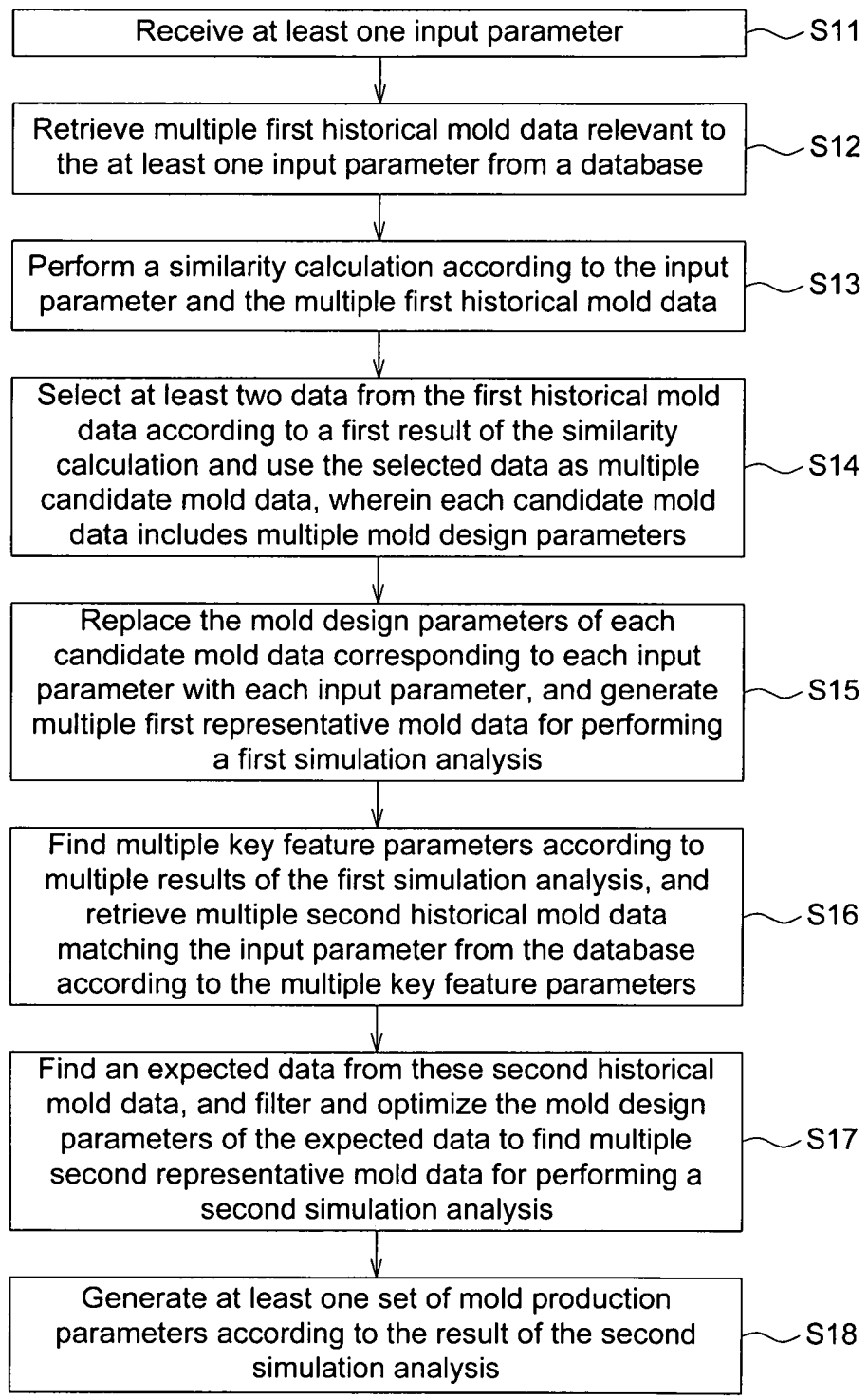
FIG. 2 is a flowchart of an optimization method based on feature extraction and machine learning according to an embodiment of the present invention.

Refer to FIG. 1 and FIG. 2 simultaneously. Firstly, a mold basic data 100 is inputted to the data retrieval unit 110 and used as a retrieval condition, such that multiple historical mold data relevant with the retrieval condition can be retrieved from the database 210. As indicated in step S11 of FIG. 2, an input parameter, such as at least one parameter of the mold basic data 100, is received by the data retrieval unit 110. Then, as indicated in step S12, multiple first historical mold data relevant to the at least one input parameter are retrieved from the database 210 by the data retrieval unit 110.

In an embodiment, the input parameters of the mold basic data 100 can be such as sprue caliber, fluid viscosity coefficient, injection pressure, material hardness, mold releasing direction, or closed height etc. The data retrieval unit 110 can be realized by a search engine, which can further be developed as a fuzzy search engine through the use of fuzzy theory, neural network technology and/or semantic search technology. A retrieval condition can be set, such that the search engine can find multiple historical mold data relevant with the input parameters of the mold basic data 100 according to the retrieval condition.

The database 210, such as a mold knowledge base, can store relevant data of existing molds and the feedback data from the model creating unit 260. Examples of the feedback data from the model creating unit 260 include the basic data (such as the category, the sprue caliber, the employed material, the mold releasing direction, and the closed height of existing molds), the historical simulation data, the result and NG (not good) type of the simulation analysis, the optimum production parameters, and the training model constructed by the model creating unit 260.

Refer to FIGS. 1 and 2 simultaneously. After data retrieval is completed, the data selection unit 220 can select multiple historical mold data having higher similarity with the at least one input parameter using a similarity calculation algorithm, and further use the selected historical mold data as the input data in the first simulation analysis. As indicated in step S13 of FIG. 2, a similarity calculation is performed by the data selection unit 220 according to the input parameter and multiple first historical mold data. In step S14, at least two data are selected from the multiple first historical mold data according to a first result of the similarity calculation and used as multiple candidate mold data. In step S15, the mold design parameters of the candidate mold data corresponding to each input parameter are replaced by each input parameter, and multiple first representative mold data for performing a first simulation analysis are generated.

Figure 3:
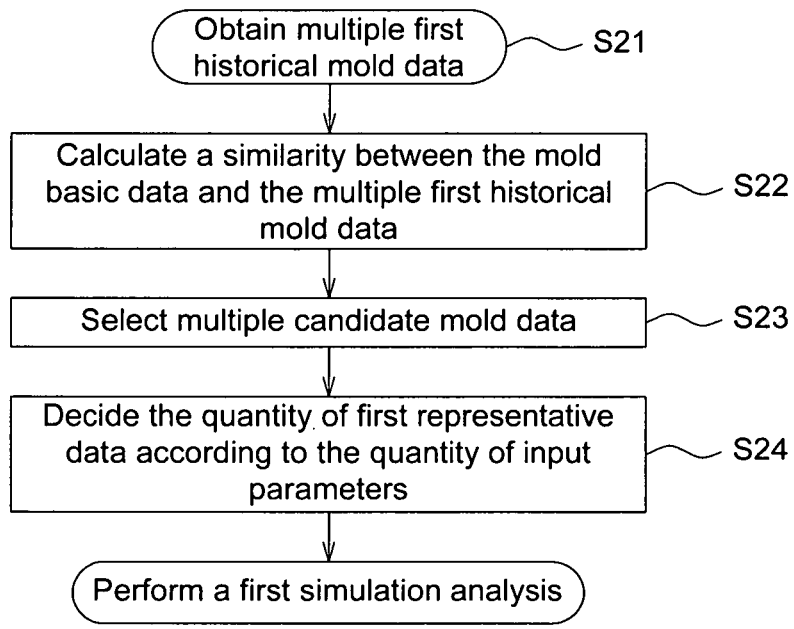
FIG. 3 is an operation diagram of the data selection unit of FIG. 1 selecting representative data.

Refer to FIG. 3. Steps S21-S24 are performed by the data selection unit 220. After the data selection unit 220 obtains the multiple first historical mold data, the similarity calculation is performed to select multiple candidate mold data having higher similarity from the multiple first historical mold data according to the result of the similarity calculation, the mold design parameters of the candidate mold data corresponding to each input parameter are replaced by each input parameter, and multiple first representative mold data for performing a first simulation analysis are generated. The data selection unit 220 can decide the quantity of first representative data according to the quantity of input parameters. In an embodiment, the similarity calculation is performed by calculating a Euclidean distance between each input parameter and its corresponding first historical mold data according to the following equation:

$$D = \sqrt{\sum_{i=1}^{n}(x_i - y_i)^2}$$

Wherein, D denotes the Euclidean distance; n denotes the quantity of input parameters; $x_i$ denotes the i-th input parameter; $y_i$ denotes the i-th mold design parameter of the corresponding first historical mold data. The smaller the Euclidean distance, the higher the similarity. In an embodiment, when the quantity n is less than 10, the quantity of first representative data can be set to n; when the quantity n is between 10-100, the quantity of first representative data can be set to 10; when the quantity n is greater than 100, the quantity of first representative data can be set to n/10. Therefore, the amount of computation can be reduced.

Refer to FIGS. 1 and 2 simultaneously. The first simulation analysis is performed using a mold flow analysis software (such as MoldFlow, 3D TIMON or Moldex 3D), such that the feature extraction unit 230 can find multiple key feature parameters influential to the result of first simulation analysis from the result of first simulation analysis for the mold data comparison unit 240 to perform comparison. As indicated in step S16 of FIG. 2, multiple key feature parameters are found by the feature extraction unit 230 according to multiple results of the first simulation analysis, and multiple second historical mold data matching the input parameter are retrieved from the database by the mold data comparison unit 240 according to the multiple key feature parameters 210.

Figure 4:
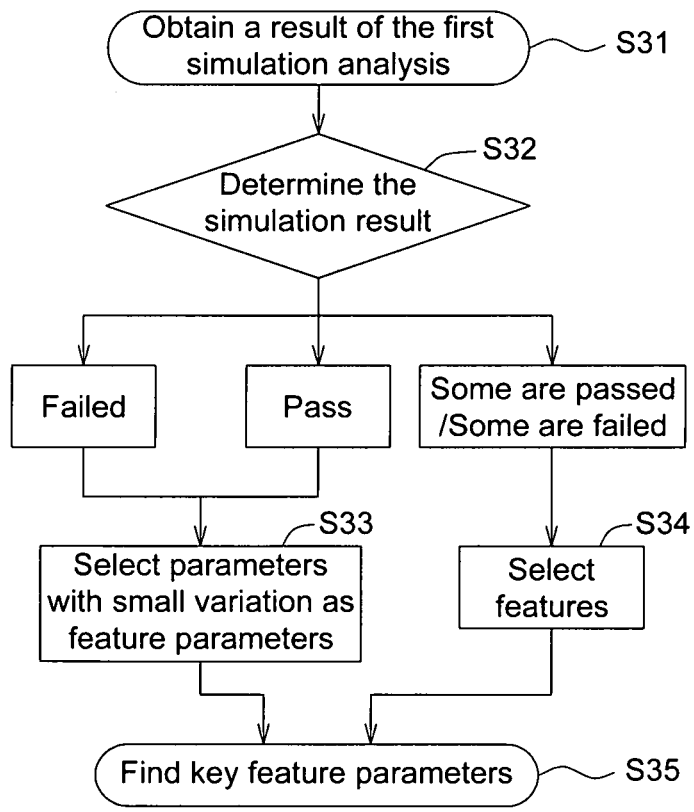
FIG. 4 is an operation diagram of the feature extraction unit of FIG. 1 finding multiple key feature parameters influential to the result of simulation analysis.

Refer to FIG. 4. Steps S31-S35 are performed by the feature extraction unit 230. After the results of the first simulation analysis are obtained by the feature extraction unit 230, when it is determined that all results of the first simulation analysis match an expected mold flow performance or it is determined that no results of the first simulation analysis match the expected mold flow performance, each mold design parameter of the multiple first representative mold data is compared, and multiple mold design parameters with minimum variation are selected by the feature extraction unit 230 and used as key feature parameters. Or, when it is determined that only some results of the first simulation analysis match an expected mold flow performance but some other results of the first simulation analysis do not match the expected mold flow performance, multiple key feature parameters are found by the feature extraction unit 230 using a feature selection algorithm. Parameters with smaller variation are stable and are less likely to be affected by other parameters. When variation is represented by percentage, the larger the percentage, the larger the variation. In an embodiment, when the quantity of parameters with smaller variation is less than 5, all of the parameters can be used as key feature parameters; when the quantity of parameters with smaller variation is greater than 5, only 5 of the parameters with smaller variation are selected and used as key feature parameters.

Examples of the feature selection algorithm for selecting key feature parameters include principle component analysis (PCA), independent component analysis (ICA) or linear discriminant analysis (LDA). The linear discriminant analysis is such as fisher's discriminant analysis.

Figure 5:
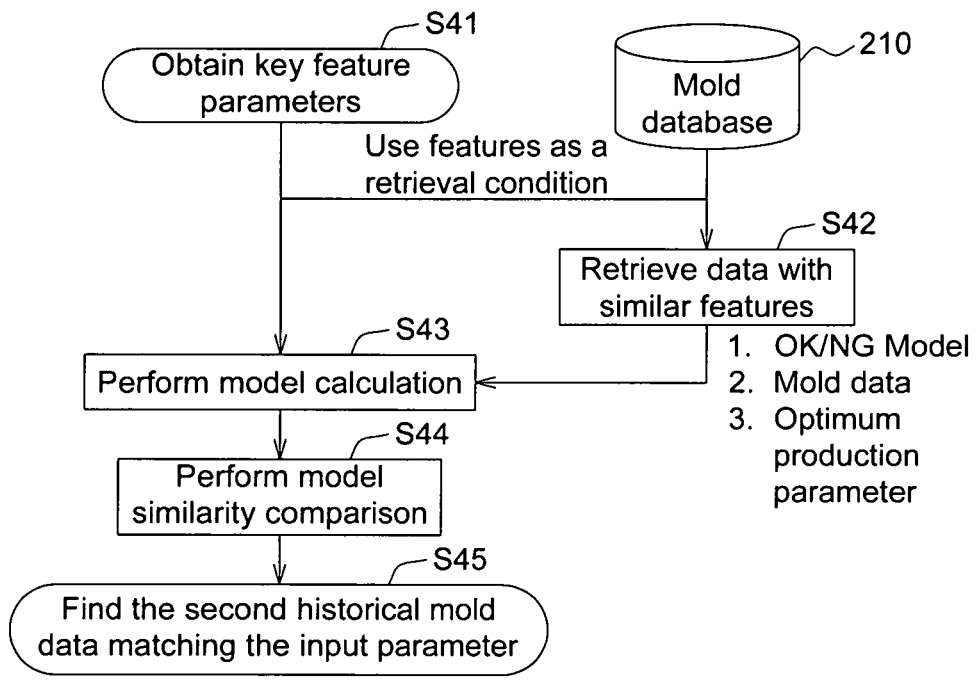
FIG. 5 is an operation diagram of the mold data comparison unit of FIG. 1 finding the second historical mold data closest to the input parameter from the database.

Refer to FIG. 5. Steps S41-S45 are performed by the mold data comparison unit 240. After the mold data comparison unit 240 obtains multiple key feature parameters, the multiple key feature parameters are used as a retrieval condition, data with similar feature parameters are retrieved from the database 210 and a model calculation is performed to retrieve multiple second historical mold data from the database, and a model similarity comparison is performed to find an expected data from the multiple second historical mold data. The expected data can be an optimum production parameter closest to the input parameter. The multiple first historical mold data are different from the second historical mold data in that the second historical mold data is obtained by using key feature parameters as a retrieval condition, therefore the variation of key feature parameters in the second historical mold data can be limited to be within a pre-set range to limit the variation range of parameters. In an embodiment, the model calculation includes: replacing the corresponding mold design parameters of the second historical mold data with key feature parameters to obtain multiple new mold data. Through the model similarity comparison between the second historical mold data and new mold data, NG models are removed, only OK models are reserved, and an expected data (the data having highest similarity by comparison) closest to the input parameter is found from OK models and used as a data set in subsequent data optimization. Model calculation is similar to a judgmental calculation, such as decision tree or other prediction models. Similarity comparison can be represented by Euclidean distance calculation.

In an embodiment, the first set of mold design parameters in multiple second historical mold data are such as A1-A10, the second set of mold design parameters are such as B1-B10, and the third set of mold design parameters are such as C1-C10. Corresponding parameters A3, A4, and A5 in the first set of mold design parameters, corresponding parameters B3, B4, and B5 in the second set of mold design parameters, and corresponding parameters C3, C4, and C5 in the third set of mold design parameters are respectively replaced with key feature parameters Y3, Y4, and Y5 to obtain 3 new mold data for use in the model similarity comparison. If the result of the model similarity comparison shows that one of the new mold data meets the expectation (the data having highest similarity by comparison), then this new mold data can be used as a data set in subsequent data optimization.

Refer to FIGS. 1 and 2 simultaneously. After the parameter optimization unit 250 obtains an expected data, multiple mold design values are found from each mold design parameter of the expected data, and variation subdivision and filtering are performed to multiple mold design parameters, and multiple second representative mold data for performing a second simulation analysis are found using a Taguchi orthogonal table. As indicated in step S17 of FIG. 2, an expected data is found from the multiple second historical mold data by the parameter optimization unit 250, and the mold design parameters of the expected data are further filtered and optimized to find a set of second representative mold data for performing a second simulation analysis.

Figure 6:
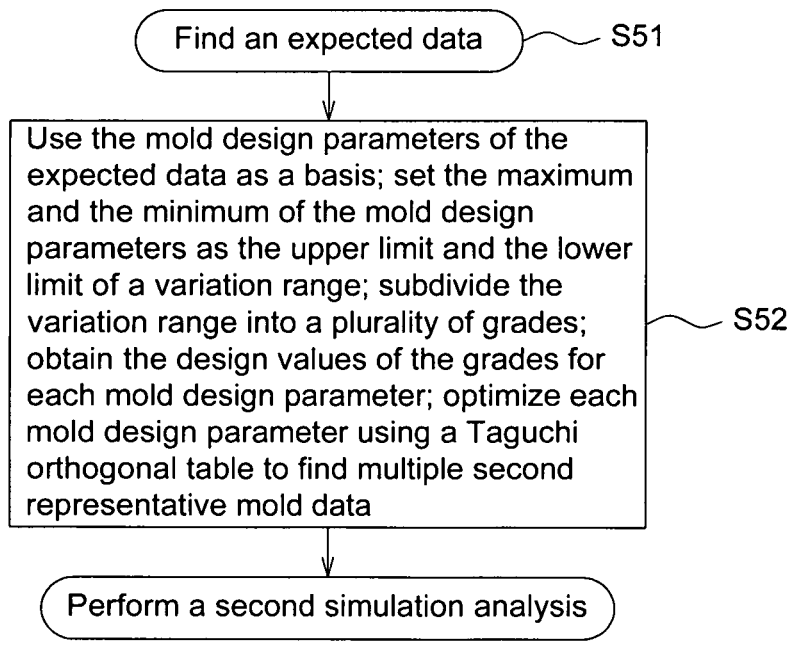
FIG. 6 is an operation diagram of the parameter optimization unit of FIG. 1 finding multiple second representative data by filtering and optimizing the mold design parameters.

Refer to FIG. 6. Steps S51-S52 are performed by the parameter optimization unit 250. After the parameter optimization unit 250 obtains an expected data, the mold design parameters of the expected data are used as a basis, the maximum and the minimum of the multiple mold design parameters are set as the upper limit and the lower limit of a variation range, the variation range is subdivided into multiple grades (for example, 5 grades), and the design values of the 5 grades are obtained for each mold design parameter. Besides, the parameter optimization unit 250 can optimize each mold design parameter using a Taguchi orthogonal table to find multiple second representative mold data and use the multiple second representative mold data as the input data in the second simulation analysis.

Refer to FIGS. 1 and 2 simultaneously. The second simulation analysis is performed using a mold flow analysis software (such as MoldFlow, 3D TIMON or Moldex 3D), and at least one set of mold production parameters 130 suitable for the production of mold testing 140 is obtained according to the result of second simulation analysis. As indicated in step S16 of FIG. 2, at least one set of mold production parameters 130 is generated according to the result of the second simulation analysis. In the present embodiment, the user determines whether to use the at least one set of mold production parameters 130 in actual production of mold testing 140 according to the NG or OK simulation data and the analysis report obtained from the result of second simulation analysis and the problems that may possibly happen. If the at least one set of mold production parameters 130 can be used in actual production of mold testing 140, a mold is manufactured according to the at least one set of mold production parameters 130, and the result of the mold flow analysis is verified. If the at least one set of mold production parameters 130 cannot be used in actual production of mold testing 140, the multiple simulation data are constructed as a training model by the model creating unit 260.

Figure 7:
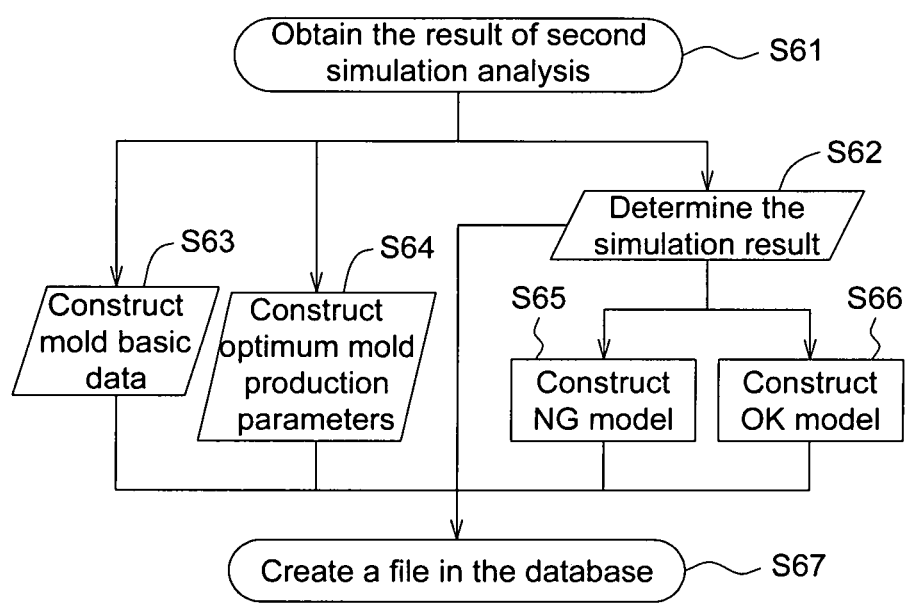
FIG. 7 is an operation diagram of the model creating unit of FIG. 1 generating at least one set of mold production parameters according to the result of the second simulation analysis.

Refer to FIG. 7. Steps S61-S67 are performed by the model creating unit 260. After the model creating unit 260 obtains the result of second simulation analysis, the mold basic data and the optimum production parameters are constructed in the database 210. If the simulation result shows that the simulation data are not suitable for the mold testing 140, then a NG model can be constructed and filed in the database 210. If the simulation result shows that the simulation data are suitable for the mold testing 140, then an OK model can be constructed and filed in the database 210 and all of which can be used as training data and comparison basis in next mold building of new mold.

The optimization method based on feature extraction and machine learning disclosed in above embodiments of the present invention can be used in CAE mold flow analysis or other simulation analysis, such as the production of the parts and the simulation analysis of machining quality, and the present invention is not limited thereto. According to the optimization method of the present embodiment, through machine learning, OK and NG data can be recorded and models can be constructed as a basis of reference during the mold building of new mold, such that the schedule of mold development can be shortened. According to the optimization method of the present embodiment, key feature parameters can be effectively found through feature extraction, and optimum production parameters can be quickly found through parameter optimization, such that the cost of mold testing can be reduced.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An optimization method based on feature extraction and machine learning, comprising:
receiving at least one input parameter;
retrieving a plurality of first historical mold data relevant to the at least one input parameter from a database;
performing a similarity calculation according to the at least one input parameter and the plurality of first historical mold data;
selecting at least two data from the plurality of first historical mold data according to a first result of the similarity calculation and using the selected data as a plurality of candidate mold data, wherein each candidate mold data comprises a plurality of mold design parameters;
replacing the mold design parameters of each candidate mold data corresponding to each input parameter with each input parameter and generating a plurality of first representative mold data for performing a first simulation analysis;
finding a plurality of key feature parameters according to a plurality of results of the first simulation analysis, and retrieving a plurality of second historical mold data matching the at least one input parameter from the database according to the plurality of key feature parameters;
finding an expected data from the plurality of second historical mold data, and filtering and optimizing the mold design parameters of the expected data to find a plurality of second representative mold data for performing a second simulation analysis;
generating at least one set of mold production parameters according to the result of the second simulation analysis; and
manufacturing a mold according to the at least one set of mold production parameters.

2. The optimization method according to claim 1, further comprising filing the result of the second simulation analysis and the plurality of second representative mold data in the database.

3. The optimization method according to claim 1, further comprising filing the plurality of results of the first simulation analysis and the plurality of first representative mold data in the database.

4. The optimization method according to claim 1, wherein the similarity calculation comprises calculating a Euclidean distance between the at least one input parameter and the plurality of first historical mold data.

5. The optimization method according to claim 1, wherein the first simulation analysis is performed using a mold flow analysis software, and when it is determined that the plurality of results of the first simulation analysis match an expected mold flow performance or it is determined that no results of the first simulation analysis match the expected mold flow performance, each mold design parameter of the plurality of first representative mold data is compared, and a plurality of mold design parameters with minimum variation are used as the plurality of key feature parameters.

6. The optimization method according to claim 1, wherein the first simulation analysis is performed using a mold flow analysis software, and when it is determined that only some of the plurality of results of the first simulation analysis match an expected mold flow performance and some other results of the first simulation analysis do not match the expected mold flow performance, the plurality of key feature parameters are found using a feature selection algorithm.

7. The optimization method according to claim 1, wherein after the plurality of key feature parameters are obtained, the optimization method further comprises: retrieving the plurality of second historical mold data from the database according to a retrieval condition based on the plurality of key feature parameters and further performing a model calculation and a model similarity comparison to the retrieved second historical mold data, wherein the model calculation comprises: replacing corresponding mold design parameters of the plurality of second historical mold data with the plurality of key feature parameters to obtain a plurality of new mold data; obtaining the data with highest similarity according to a result of the model similarity comparison between the plurality of second historical mold data and the plurality of new mold data to find the expected data from the plurality of second historical mold data.

8. The optimization method according to claim 7, wherein after the expected data is obtained, the optimization method further comprises: finding a plurality of mold design values from each mold design parameter of the expected data; performing variation subdivision and filtering to the plurality of mold design parameters; and finding the plurality of second representative mold data for performing the second simulation analysis using a Taguchi orthogonal table.

9. The optimization method according to claim 8, wherein the variation subdivision comprises: using the mold design parameters of the expected data as a basis; setting the maximum and the minimum of each mold design parameter as the upper limit and the lower limit of a variation range; subdividing the variation range into a plurality of grades; and obtaining the design values of the grades for each mold design parameter.

\* \* \* \* \*